(12) United States Patent
Nishihama et al.

(10) Patent No.: US 8,816,559 B2
(45) Date of Patent: Aug. 26, 2014

(54) SQUIRREL CAGE INDUCTION MOTOR AND SQUIRREL CAGE INDUCTION MOTOR DRIVING SYSTEM

(75) Inventors: Kazuo Nishihama, Hitachinaka (JP); Hiroyuki Mikami, Hitachinaka (JP); Tadahiro Shimozono, Yachiyo (JP); Keiichiro Kaihatsu, Kamagaya (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 792 days.

(21) Appl. No.: 13/125,492

(22) PCT Filed: Aug. 20, 2009

(86) PCT No.: PCT/JP2009/064584
§ 371 (c)(1),
(2), (4) Date: May 19, 2011

(87) PCT Pub. No.: WO2010/047173
PCT Pub. Date: Apr. 29, 2010

(65) Prior Publication Data
US 2011/0210692 A1    Sep. 1, 2011

(30) Foreign Application Priority Data
Oct. 23, 2008  (JP) .................. 2008-272718

(51) Int. Cl.
*H02K 17/16*  (2006.01)
*H02K 17/00*  (2006.01)

(52) U.S. Cl.
CPC .................... *H02K 17/165* (2013.01)
USPC ........................................................ 310/211

(58) Field of Classification Search
CPC .............. H02K 17/165; H02K 1/165
USPC ................................. 310/210–213
See application file for complete search history.

(56) References Cited

U.S. PATENT DOCUMENTS

| | | | | |
|---|---|---|---|---|
| 3,597,646 A | * | 8/1971 | Lawrenson | 310/166 |
| 3,778,652 A | * | 12/1973 | Endress | 310/211 |

(Continued)

FOREIGN PATENT DOCUMENTS

| | | |
|---|---|---|
| JP | 60-39352 A | 3/1985 |
| JP | 3-195347 A | 8/1991 |

(Continued)

OTHER PUBLICATIONS

PCT/ISA/237 Form (Four (4) pages).

(Continued)

*Primary Examiner* — Thanh Lam
(74) *Attorney, Agent, or Firm* — Crowell & Moring LLP

(57) ABSTRACT

A squirrel cage induction motor includes: a stator core (11); a plurality of stator slots (12) radially disposed in a circumferential direction of the stator core (11) with predetermined intervals; a plurality of stator windings (13) housed in the stator slots respectively; a rotor core (21); a plurality of rotor slots (22) radially disposed in a circumferential direction of the rotor core (22) with predetermined intervals; a plurality of rotor conductors (23) housed in the rotor slots (22) respectively. The stator windings (13) and the rotor conductors (23) includes electrically conductive materials mainly composed of copper. An area ratio of a total area of the stator slots (12) to a total area of the rotor slots (22) is not smaller than 2.7 and not greater than 8.0 to provide compatibility between the starting characteristic (starting torque) and the steady characteristic (for a high efficiency) can be provided.

11 Claims, 7 Drawing Sheets

(56) References Cited

U.S. PATENT DOCUMENTS

| | | | |
|---|---|---|---|
| 4,566,179 A * | 1/1986 | Sawyer et al. | 29/596 |
| 5,155,404 A * | 10/1992 | Sadarangani | 310/211 |
| 5,565,752 A * | 10/1996 | Jansen et al. | 318/807 |
| 5,610,465 A * | 3/1997 | Sakamoto et al. | 310/211 |
| 2004/0183390 A1 | 9/2004 | Nishihama et al. | |
| 2007/0126310 A1 | 6/2007 | Tang et al. | |
| 2008/0203846 A1* | 8/2008 | Hoemann et al. | 310/216 |
| 2009/0160285 A1* | 6/2009 | Kikuchi et al. | 310/156.78 |
| 2010/0026008 A1* | 2/2010 | Sawahata et al. | 290/55 |

FOREIGN PATENT DOCUMENTS

| | | |
|---|---|---|
| JP | 2004-248361 A | 9/2004 |
| JP | 2007-159400 A | 6/2007 |
| JP | 2007-166796 A | 6/2007 |

OTHER PUBLICATIONS

International Search Report including English language translation dated Sep. 15, 2009 (Four (4) pages).

Japanese Office Action with partial English translation dated Jul. 23, 2013 (five (5) pages).

* cited by examiner

SQUIRREL CAGE INDUCTION MOTOR AND SQUIRREL CAGE INDUCTION MOTOR DRIVING SYSTEM

TECHNICAL FIELD

The present invention relates to a squirrel cage induction motor with improvement in a slot area ratio between a stator and a rotor and a squirrel cage induction motor driving system for driving squirrel cage induction motor.

BACKGROUND ART

Conventionally, various improvements in configuration have been made for miniaturization and a high efficiency in the motor. For example, in a duplex feeding type squirrel cage induction motor, a technology is disclosed which intends to miniaturize the motor and to have a high efficiency by equalizing current densities of stator windings and rotor windings by equalizing an area ratio between stator slots and rotor slots (see patent document 1). According to this technology, equalizing the current density between the stator windings and the rotor windings relatively equalizes increase in temperature between the stator and the rotor. This can avoid decrease in a generation torque, so that it is possible to miniaturize the motor and to have a high efficiency in the squirrel cage induction motors. In addition, a technology is disclosed in which, by setting a slot area of the stator of a small-size capacitor type of induction motor to 0.45 to 0.65 of an area of a circle of which diameter is equal to a diameter of an outer diameter of the stator, a quantity of a used iron core can be reduced by 25% and a quantity of used conducting wires can be reduced by 18% for the same characteristic, and an output characteristic is increased by 145% for the same size (see patent document 2).

PRIOR ART

Patent Document

[Patent Document 1] JP 2007-166796 A
[Patent Document 2] JP S60-39352 A

DISCLOSURE OF THE INVENTION

Problem to be Solved by Invention

However, Patent document 1 is a technology relating to the duplex feeding type squirrel cage induction, and in the general motor, because a magnitude of a secondary current largely varies as an induction current in accordance with an operation status, a current ratio between the stator windings and the rotor windings varies in accordance with the operation status, so that it is difficult to uniquely determine the area ratio between the stator slots and the rotor slots by only the current ratio of the stator windings and the rotor windings. On the other hand, the technology of Patent document 2 is a technology relating to the slot area of the stator. However it is difficult to provide compatibility between improvement of a starting characteristic (improvement in a starting torque) and a steady characteristic (to have a high efficiency) in the induction motor by only adjusting the slot area.

The present invention is developed in consideration of these problems and aims to provide a squirrel cage induction motor capable of providing compatibility between improvement in the torque characteristic at startup and a high efficiency at the steady status and a squirrel cage induction motor driving system for driving the squirrel cage induction motor.

Measure for Solving Problem

To solve the aforementioned problems, the squirrel cage induction motor adopts a configuration of a squirrel cage induction motor comprising:
a stator core;
a plurality of stator slots radially disposed in a circumferential direction of the stator core with predetermined intervals;
a plurality of stator windings housed in the stator slots, respectively;
a rotor core;
a plurality of rotor slots radially disposed in a circumferential direction of the rotor core with predetermined intervals;
a plurality of rotor conductors housed in the rotor slots, respectively,
wherein the stator windings and the rotor conductors comprise electrically conductive materials mainly composed of copper, and
wherein an area ratio of a total of the stator slots to a total of the rotor slots is not smaller than 2.3 and not greater than 8.0 (preferably, not smaller than 2.7 and not greater than 8.0).

According to the configuration, to improve the starting characteristic and the steady characteristic of the squirrel cage induction motor simultaneously, in an aspect of the present invention, a conductive material composed of copper or copper alloy is used for the stator windings and the stator conductor, and the area ratio of the total area of the stator slots to a total area of the rotor slots are set to be not smaller than 2.3 and not greater than 8.0 (preferably, not smaller than 2.7 and not greater than 8.0).

Advantageous Effect of Invention

According to the squirrel cage induction motor of the present invention, compatibility can be provided between the starting characteristic (starting torque) and the steady characteristic (for a high efficiency) in improvement by using the conductive material composed of copper or the copper alloy for at least the rotor conductors with selection of the area ratio between the total area of the stator slots to the total area of the stator slots within a rang from 2.3 to 8.0 (preferably, not smaller than 2.7 and not greater than 8.0).

BEST MODE FOR CARRYING OUT THE INVENTION

In the squirrel cage induction motor according to the present invention it is intended to provide a high efficiency by using a conductive material such as copper having a low electric resistivity for stator windings and rotor conductors as well as having a predetermined electric resistance at a startup to secure a predetermined starting torque, so that compatibility between improvement in the starting characteristic (starting torque) and improvement of the steady characteristic (efficiency) is provided.

For that purpose, a ratio (area ratio) of a total area of the stator slots to a total area of the rotor slots is set to be within a predetermined range.

Hereinbelow with reference to the drawings will be described in detail squirrel cage induction motors according to respective embodiments of the present invention.

Figure 1:
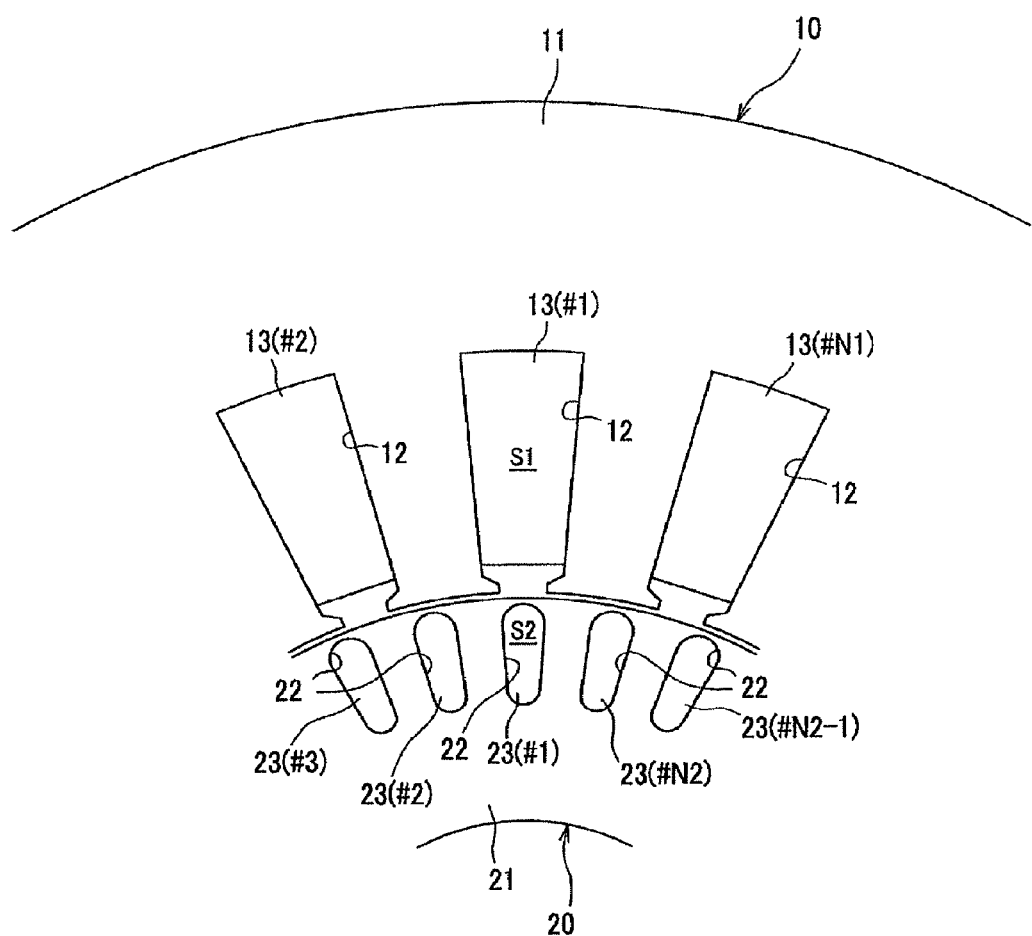
FIG. 1 is a partial cross-sectional view of a squirrel cage induction motor of respective embodiments of the present invention.

FIG. 1 is a partial cross-sectional view of squirrel cage induction motors of respective embodiments of the present invention.

As shown in FIG. 1, a stator 10 of the squirrel cage induction motor includes a stator core 11, a plurality of stator slots 12 disposed in a circumferential direction near an inner circumference of the stator core 11 with equal intervals, and stator windings 13 embedded in the stator slots 12. Here, an area of one stator slot 12 is assumed as S1, and the number of the slots of the stator slots 12 is assumed as N1.

On the other hand, a rotor 20 includes a rotor core 21, a lot of slots 22 disposed in a circumferential direction near an outer circumference of the rotor core 21 with predetermined intervals, and rotor conductors 23 embedded in these rotor slots 22. An area of one of the rotor slots 22 is assumed to be S2 and the number of the slots of the rotor slots 22 is assumed as N2.

In each of the embodiments of the present invention, the stator windings 13 and the rotor conductor 23 are conductor materials composed of copper. If a ratio of a total area (S1×N1) of the stator slots 12 to the total area (S2×N2) of the rotor slots 22 is assumed as an area ratio, the area ratio is not smaller than 2.7 and not greater than 8.0

To increase the efficiency of the squirrel cage induction motor, it is desired to reduce a loss generated in the rotor conductor 23 by decreasing an electrical resistance of the rotor conductors 23. However, at a startup of the squirrel cage induction motor, the electrical resistance of the rotor conductors 23 is proportional to a stating torque (when the loss is reduced by decreasing the electrical resistance of the rotor conductor 23, the starting torque is decreased). Accordingly, if the conductor martial is simply changed to that having a lower electric resistivity (for example, the conductor material is changed from aluminum to copper), the starting characteristic (starting torque) becomes worse. In other words, in the squirrel cage induction motor, when it is tried to increase the efficiency by decreasing the electric resistance of the rotor conductor 23, the starting torque will decrease.

Because the high efficiency and increase in the starting torque have a trade off relation, improvement in these characteristics can be provided by devising a cross-sectional shape of the rotor conductor 23 in the squirrel cage induction motor having a variable frequency inverter as a power source. This technology is known (for example, JP 2004-248361) in which increases an electrical resistance of the rotor conductor 23 using the skin effect, which is a deviation in current distribution by increasing a frequency of the inverter only at a startup. However, the improvement in the starting characteristic (starting torque) can be provided by increasing the electrical resistance of the rotor conductor 23 only at the startup using the skin effect. However, when a cross-sectional area of the rotor conductor 23 is small, the skin effect becomes low, so that the improvement range in the starting torque will be necessary small. In addition, when a frequency of a driving current of the squirrel cage induction motor is low (for example, when the squirrel cage induction motor is driven by a commercial power source), influence by the skin effect becomes small, so that the improvement range in the starting torque will be small.

Figure 2:
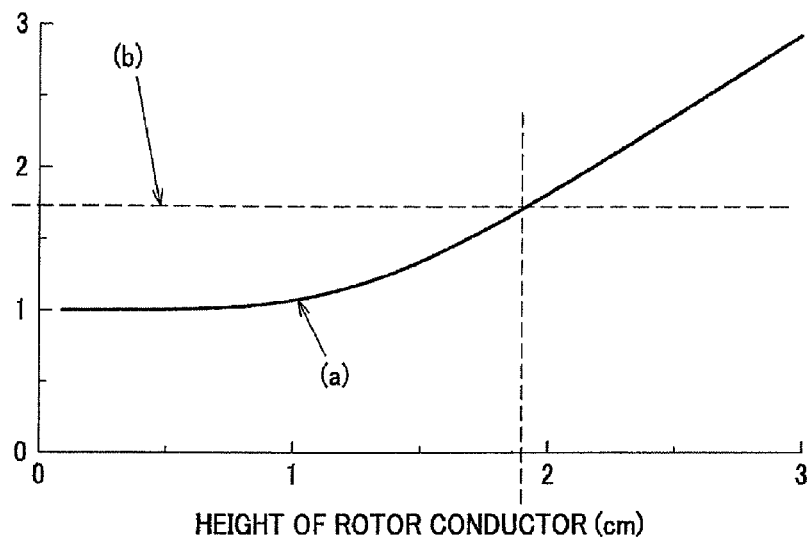
FIG. 2 is a chart illustrating a ratio of an electric resistance of the rotor conductors using copper as the conductor material in the steady status of the rotor conductor to the electric resistance at startup.

FIG. 2 illustrates a ratio of an electric resistance of the rotor conductors 23 at the startup to that of the rotor conductors 23 using copper as the conductor material in the steady status (at a rated rotation speed). The axis of abscissa represents a height of the rotor conductors 23, and the axis of ordinate represents the ratio of an electric resistance of the rotor conductors (p.u.: per unit). Here, it is assumed that the electric resistance of copper of the rotor conductor 23 in the steady status is 1 p.u.

In FIG. 2, a characteristic (a) indicated with a solid line represents the ratio of the electric resistance of the rotor conductor 23 composed of copper at the startup to that in the steady status (at the rated rotation speed). The broken line represents an electric resistance of the rotor conductor 23 composed of aluminum in the steady status to an electric resistance of the rotor conductors composed of copper in the steady status. As understood from FIG. 2, when a height of the rotor conductor 23 in a diameter direction of the rotor 20 (hereinbelow will be simply referred to as a height of the rotor conductor 23) is equal to or smaller than 19 mm, the ratio of the electric resistance of the rotor conductor 23 composed of copper is smaller than the ratio of the electric resistance of the rotor conductor made of aluminum. However, when the height of the rotor conductor 23 in the diameter direction of the rotor 20 exceeds 19 mm, the ratio of the electric resistance of the rotor conductors 23 composed of copper is greater than the ratio of the electric resistance of the rotor conductor made of aluminum.

In other words, it is understood that in a case that the material of the rotor conductor 23 shown in FIG. 1 is changed from copper to aluminum, when the height of the rotor conductors 23 is equal to or smaller than 19 mm, the electric resistance at the startup becomes smaller than the electric resistance of the rotor conductor composed of aluminum, so that it is difficult to improve the start characteristic (starting torque) using the skin effect at the startup of the squirrel cage induction motor like the technology disclosed in JP 2004-248361.

Then, each of the embodiments of the present invention provides the squirrel cage induction motor which can provide both improvements in the starting characteristic (starting torque) and the steady characteristic (efficiency) even when the height of the rotor conductors 23 is equal to or smaller than 19 mm.

More specially, in the squirrel cage induction motor of each of the embodiments of the present invention, the startup characteristic is improved not dependently on the skin effect in the rotor conductor 23, but by decreasing a cross-sectional area of the rotor conductor 23 and increasing the electric resistance of the rotor conductor 23 which is proportional to the starting torque. This makes the height of the rotor conductor 23 equal to or smaller than 19 mm, so that the starting characteristic can be improved even when the skin effect becomes low.

However, when the electrical resistance is increased by making the cross-sectional area of the rotor conductor 23 smaller by making the height of the rotor conductors 23 not greater than 19 mm, the electric resistance of the rotor conductor 23 becomes larger in the steady status (at the rated rotation speed), so that an efficiency will decrease because a loss generated in the rotor conductor 23 will increase. Then, an outer diameter of the rotor 20 and the inner diameter of the stator 10 are made smaller by a decreased amount in the cross-sectional area of the rotor conductor 23, so that an area of the stator 10 is increased and cross-sectional area of the stator slots 12 and the stator winding 13 can be increased. This decreases the electric resistance of the stator winging 13, reducing the loss generated in the stator winding 13, improving the efficiency.

First Embodiment

Figure 3:
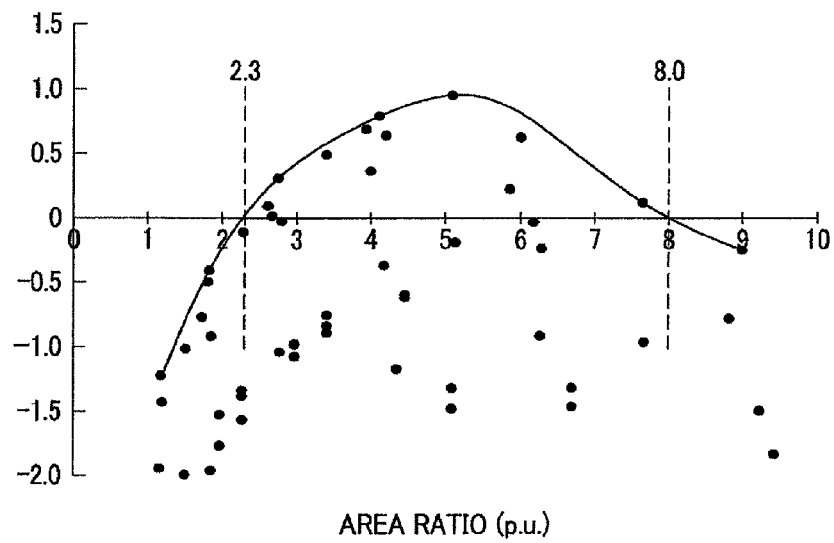
FIG. 3 is a chart illustrating an efficiency characteristic of the squirrel cage induction motor according to a first embodiment of the present invention.

FIG. 3 is a chart illustrating a characteristic of the efficiency, according to IE3 standard, of the squirrel cage induction motor according to the first embodiment. The axis of abscissa represents a ratio of a total area of the stator slots 12 to a total are of the rotor slots 22 (p.u.), and the axis of ordinate represent the efficiency (%) according to IE3 standard.

IE3 standard is a standard of the efficiency for a rotational electric apparatus (motor) defined by International Standard Correspondence IEC60034-30 which specifies an efficiency level for each output capacity of the rotational electric apparatus under IE3 standard.

Accordingly, in the chart of the characteristic shown in FIG. 3, the case that the efficiency according to IE3 standard on the axis of ordinate is not smaller than 0.0% has an efficiency not smaller than levels of IE3 standard. Here, the height of the rotor conductor 23 is set to be not greater than 19 mm.

As understood from FIG. 3, because the efficiency of the squirrel cage induction motor is not smaller than the efficiency level according to IEC60034-30 of IE3 standard within a range where the area ratio of the total area of the stator slots 12 to the total area of the rotor slots 22 is not smaller than 2.3 and not greater than 8.0, a high efficiency squirrel cage induction motor can be provided in a case that the area ratio of the total area of the stator slots 12 to the total area of the rotor slots 22 is within a range not smaller than 2.3 and not greater than 8.0. Each of plotted points in FIG. 3 represents an actually measured efficiency according to IE3 standard from measurement in a lot of prototype of the squirrel cage induction motors.

In other words, the squirrel cage induction motor capable of providing the efficiency higher than the efficiency level according to IE3 standard (IE3 standard level) which represents one of technical levels can be estimated as a high efficiency squirrel cage induction motor. Accordingly, high efficiency squirrel cage induction motors can be provided through manufacturing the squirrel cage induction motor of which area ratio of the total area of the stator slots 12 to the total are of the rotor slots 22 is in a range from 2.3 to 8.0 inclusively.

Figure 4:
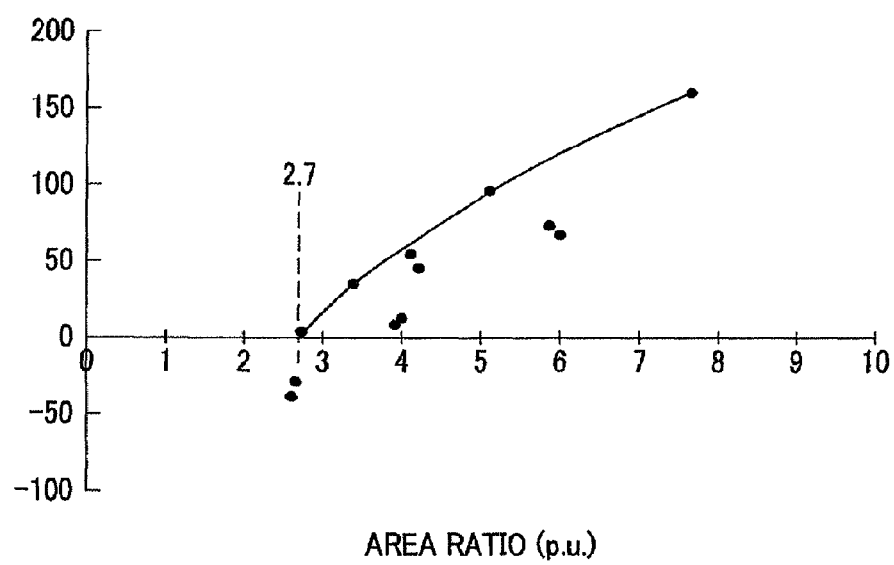
FIG. 4 is a chart illustrating the starting torque characteristic of the squirrel cage induction motor according to the first embodiment of the present invention.

FIG. 4 is a chart illustrating the startup torque characteristic of the squirrel cage induction motor according to the first embodiment of the present invention.

In this chart illustrating the characteristic, an axis of abscissa represents the area ratio (p.u.) of the total area of the stator slots 12 to the total area of the rotor slots 22, and the axis of ordinate represents the starting torque (%) according to JIS C4210 standard. JIS C4210 standard is an international standard specifying an electric characteristic of low voltage three phase squirrel cage induction motors and includes levels of the starting torques for each rated output. In addition, each of the plotted points in FIG. 4 shows only a part of a characteristic curve of the prototype of the squirrel cage induction motor which exceeds efficiencies the IE3 standard level in FIG. 3.

As shown in FIG. 4, in a case that the area ratio of the total area of the stator slots 12 to the total area of the rotor slots 22 is not smaller than 2.7, a squirrel cage induction motor is provided with a secured good starting torque which is not smaller than the starting torque standard level according to JIS C4210 standard. Each of the plotted points in FIG. 4 represents an actual measurement value obtained by measurement of the prototype squirrel cage induction motor used in FIG. 3.

The squirrel cage induction motor capable of providing the efficiency higher than the efficiency level according to JIS C4210 standard which represent one of technical levels can be estimated as a high efficiency squirrel cage induction motor. A high efficiency squirrel cage induction motor can be provided through manufacturing the squirrel cage induction motor of which area ratio of the total area of the stator slots 12 to the total area of the rotor slots 22 is not smaller than 2.7.

More specifically, according to the chart of the efficiency characteristic with respect to the area ratio shown in FIG. 3 and the chart of the starting torque characteristic to the area ratio shown in FIG. 4, the area ratio of the total area of the stator slots 12 to the total area of the rotor slots 22 is set to a value not smaller than 2.7 and not greater than 8.0, which provides the squirrel cage induction motor with compatibility between the staring characteristic (secured starting torque) and the steady characteristic (improvement for a high efficiency). In other words, because the squirrel cage induction motors satisfying IE3 standard defined by IEC60034-30 and JIS C4210 standard are those clearing the technical levels for commercialization, the squirrel cage induction motor with compatibility between the starting characteristic (the starting toque is secured) and the steady characteristic (improvement for a high efficiency) by realizing a squirrel cage induction motor having the area ratio of the total area of the stator slots to the total area of the rotor slots 22 which is not smaller than 2.7 and not greater than 8.0.

Second Embodiment

In the first embodiment, the squirrel cage induction motor connected to a variable frequency inverter as the power source is exemplified. In the second embodiment, will be described a squirrel cage induction motor directly supplied with an AC power having a frequency of the commercial power without intervention by the variable frequency inverter.

A power source in the second embodiment has a breaker for supplying three-phase AC power received by a receiving board from a commercial three phase AC power source to the stator windings 13 of a three-phase squirrel cage induction motor without any change, i.e., without intervention by the variable frequency inverter. More specifically, the squirrel cage induction motor according to the second embodiment can be started up with the power having a commercial frequency, i.e., a commercial power source) without intervention by the variable frequency inverter, because the starting torque can be secured which is not smaller than the rated torque by setting the area ratio to a value not smaller than 2.7 and not greater than 8.0. In addition, because there is no intervention by the variable frequency inverter, a loss in the variable frequency inverter is eliminated, so that the efficiency of the squirrel cage induction motor driving system can be improved.

Third Embodiment

FIGS. 5A to 5D are partial sectional views of rotor slots and rotor conductors of the squirrel cage induction motors according to a third embodiment of the present invention. In the third embodiment, in the configurations according to the first and second embodiments, sectional shapes of rotor conductors 231 to 234 are configured as shown in FIGS. 5A, 5B, 5C, and 5D.

Figure 5A:
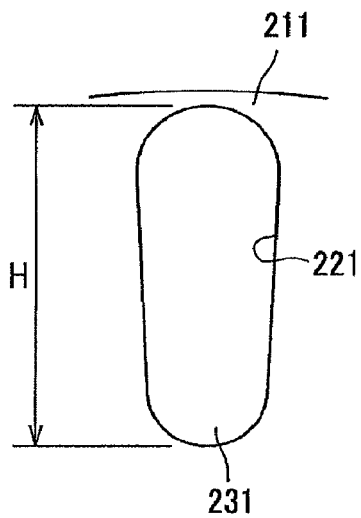
FIGS. 5A to 5D are partial sectional views of rotor slots and rotor conductors of the squirrel cage induction motors according to a third embodiment of the present invention.

In a first example shown in FIG. 5A has a fully-closed configuration having no opening on an outer circumferential side of the rotor slots 221 formed in the rotor core 211 and has semi-circle shapes on both the outer circumferential side and the inner circumferential side of the rotor slot 221. The rotor slots 221 are shaped by, for example, die-casting copper. As described, there is no opening part in the fully closed configuration of the rotor slots 221. This prevents for copper from running out to the outer circumferential side of the rotor slots 221, so that the squirrel cage induction motor can be easily manufactured. In addition, the rotor slot 221 has a strong configuration due to less concentration of stress in the rotor slot 221 because of having the semi-circle shapes on both the outer and inner circumferential sides of the rotor slots 221.

Figure 5B:
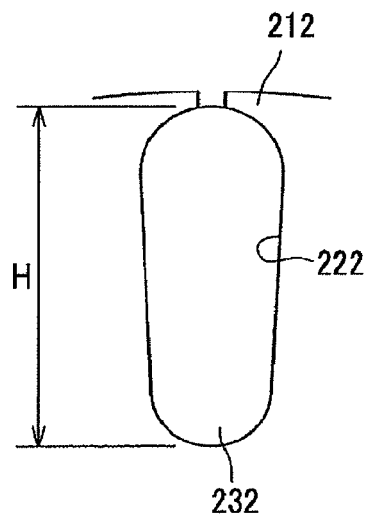

The second example shown in FIG. 5B has a semi-closed configuration where an outer circumferential side of the rotor slot 222 formed in the rotor core 212 is partially opened, and a rotor conductor 232 is formed in the rotor slot 222 except the opening part (semi-closed part). The semi-closed part is an air layer, but may comprise a material having substantially same permeability as the air (such as urethane foam). As described, a part of the outer circumferential side of the rotor slot 222 has a semi-closed configuration, which can decrease the permeability at the semi-closed part, so that a magnetic flux leaking in circumferential direction can be reduced. As a result, a power factor is improved because a quadrature current component by the leaked magnetic flux in the circumferential direction decreases, and a power factor is improved. This can reduce a current in the stator winding 13 (see FIG. 1), so that the efficiency can be improved.

Figure 5C:
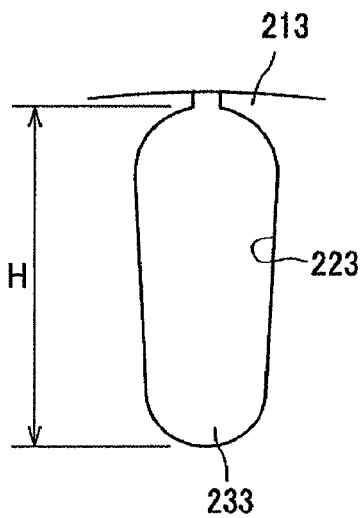

FIG. 5C shows a semi-closed configuration in which an outer circumferential side of the rotor slot 223 formed in the rotor core 213 is partially opened in which a rotor conductor 233 is formed with conductors (such as copper) in the rotor slot 223 including the semi-closed part. This facilitates to manufacture the armature windings, because the rotor core 213 can be manufactured by die-casting using a jig which is applied to an outside of the rotor core 213, so that it is not necessary to shave copper at the semi-closed part after die-casting.

Figure 5D:
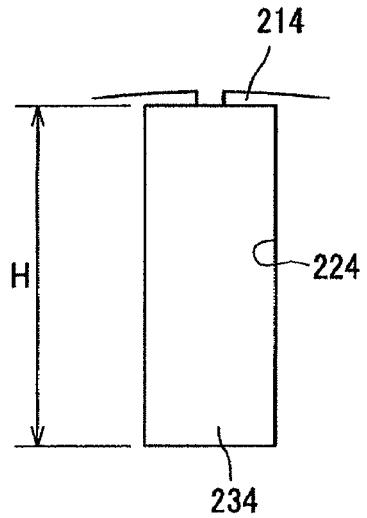

FIG. 5D illustrates a manufactured rotor 20 (see FIG. 1) in which a rotor slot 224 in the rotor core 214 is formed in a rectangular shape, and a rotor conductor 234 is driven and inserted into the rotor slot 224. In FIG. 5D, the shape of the rotor slot 224 is a rectangular. However, the rotor slot 224 may be formed in other shape such as a trapezoid. The rotor conductors 234 are connected to each other at both ends of the rotor conductors with a short-circuit ring. A method of connecting the rotor conductors 234 can be selected from brazing, welding, and a friction stir joint.

In each of the examples shown in FIGS. 5A to 5D, H represents heights of the rotor conductors 231 to 234 and not greater than 19 mm. Also, in the first and second embodiments, the height of the conductors 23 is H as shown in FIGS. 5A to 5D.

Fourth Embodiment

In the first to third embodiments, copper is used as conducting material for the rotor conductor 23 (see FIG. 1). However, a copper alloy or other conduction materials having substantially the same electrical resistivity as copper may be used in place of the copper. For example, when an alloy of aluminum and copper is used, a melting point is reduced relative to the copper, which facilitates to manufacture the rotor conductor 23 by die-casting. When an electric resistivity of the rotor conductor 23 is greater than that of copper, the area ratio for the scurrile-cage induction motor with compatibility between the starting characteristic (starting torque is secured) and the steady characteristic (to have a high efficiency) shifts toward a smaller side from the value not smaller than 2.7 and not greater than 8.0 in the first to third embodiments.

The electric resistivity also varies with a temperature, and the electric resistivity of copper is 1.7241 μΩ·cm at 20° C. according to Electrical Engineering Handbook and can be calculated at a given temperature T by an equation of 1.7241 (1+0.00393 (T−20)). Therefore, the electric resistivity of copper is 0.37 μΩ·cm at a cryogenic temperature of −196° C. and 3.28 μΩ·cm at a maximum allowable temperature of 250° C. in the JEC-2137-2000 standard which is Standard requirements defined by the Institute of Electrical Engineers of Japan.

Fifth Embodiment

Figure 6:
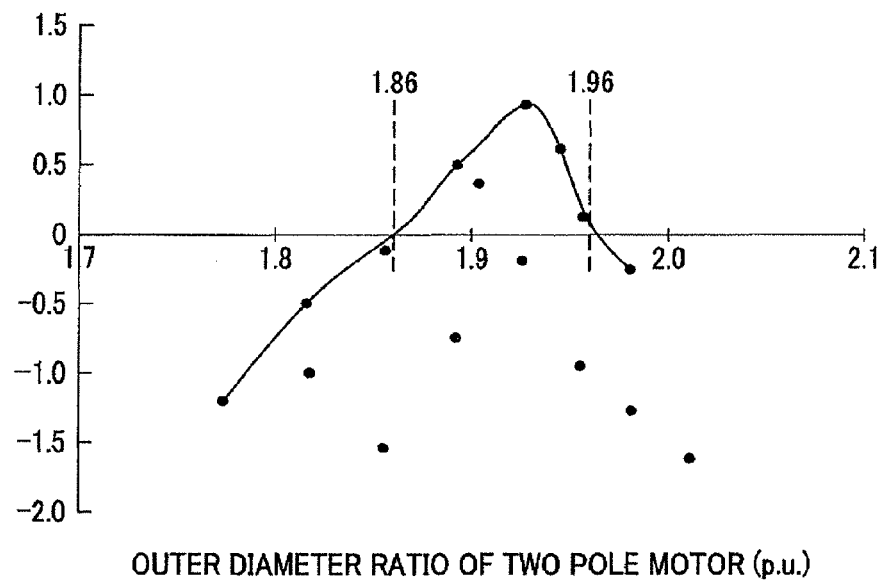
FIG. 6 is a chart of an efficiency characteristic of two-pole type of the squirrel cage induction motor according to a fifth embodiment of the present invention.

FIG. 6 is a chart of an efficiency characteristic of two-pole type of the squirrel cage induction motor according to a fifth embodiment of the present invention with respect to IE3 standard. The axis of abscissa represents the outer diameter ratio (p.u.) of the stator slot 12 of the two-pole type of the induction motor to the rotor slot 22, and the axis of ordinate represents the starting torque (%) with respect to IE3 standard. The height of the rotor conductors 23 is not greater than 19 mm. In the aforementioned first to fourth embodiments, if it is assumed that an outer diameter ratio is defined as a ratio of the outer diameter of the stator core 11 to the outer diameter of the rotor core 21, as shown in FIG. 6, squirrel cage induction motors having the outer diameter ratio not smaller than 1.86 and not greater than 1.96 satisfy a level of the IE3 standard, so that the squirrel cage induction motors with high efficiencies are provided. Each of the plotted points in FIG. 6 is an actual measurement value obtained through measurement on various prototype squirrel cage induction motors which were manufactured.

Figure 7:
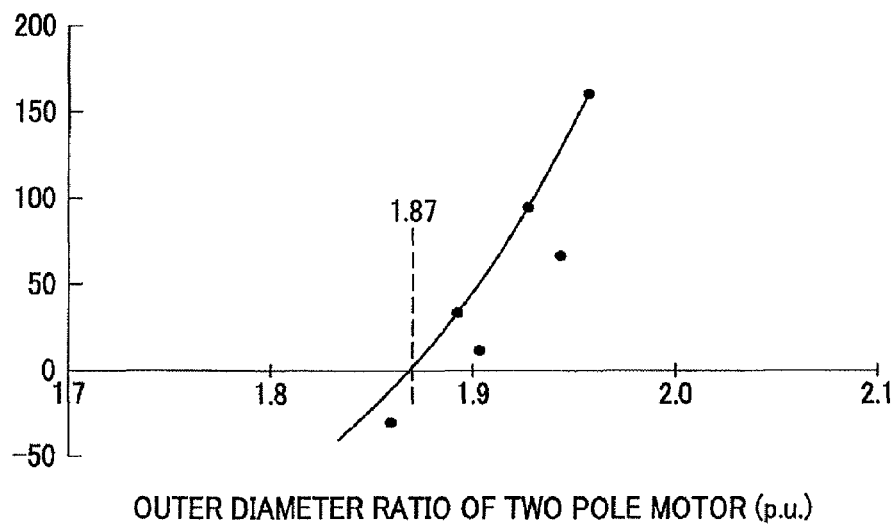
FIG. 7 is a chart of a starting torque characteristic of two-pole type of the squirrel cage induction motor according to the fifth embodiment of the present invention.

FIG. 7 is a chart of a starting torque characteristic of two-pole type of the squirrel cage induction motor according to the fifth embodiment of the present invention with respect to JIS C4210 standard. The axis of abscissa represents the outer diameter ratio (p.u.) of the stator slot 12 to the rotor slot 22, and the axis of ordinate represents the starting torque (%) with respect to JIS C4210 standard.

As shown in FIG. 7, when the outer diameter ratio is not smaller than 1.87, the starting torque satisfies the starting torque standard of JIS C4210, so that the squirrel cage induction motor having a desired starting torque can be provided. The outer diameter ratio is not greater than 1.96 as shown in FIG. 6.

More specifically, according to the chart of the efficiency characteristic of the two-pole type squirrel cage induction motor shown in FIG. 6 and the chart of the starting torque characteristic of the two-pole type squirrel cage induction motor shown in FIG. 7, setting the outer diameter ratio of the stator slot 12 to the rotor slot 22 of the two-pole type squirrel cage induction motor to a value not smaller than 1.87 and not greater than 1.96 (see FIG. 6) provides a squirrel cage induction motor with a high compatibility between the starting characteristic (with secureness of starting torque) and a steady characteristic (with a high efficiency).

Sixth Embodiment

Figure 8:
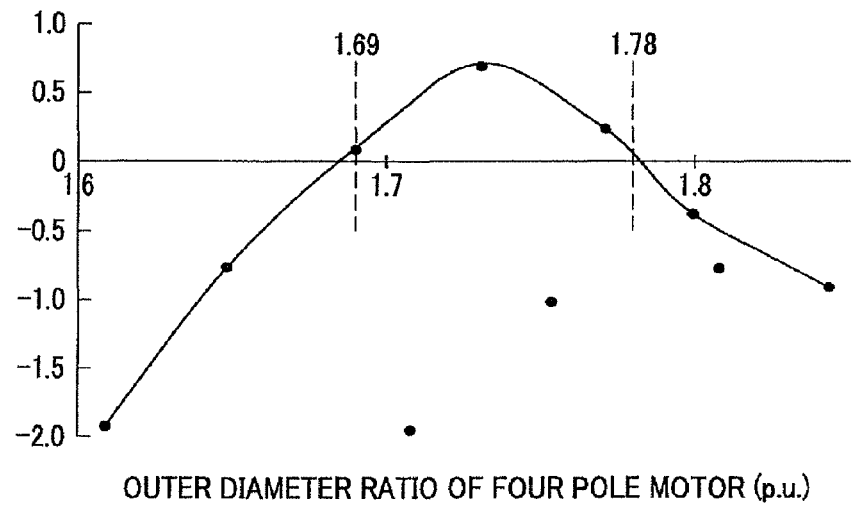
FIG. 8 is a chart of an efficiency characteristic of a four-pole type of squirrel cage induction motor according to a sixth embodiment of the present invention.

FIG. 8 is a drawing of an efficiency characteristic of four-pole type of the squirrel cage induction motor according to a sixth embodiment of the present invention with respect to IE3 standard. The axis of abscissa represents the outer diameter ratio (p.u.) of the stator slot 12 of the four-pole type of the induction motor to the rotor slot 22 of the four-pole type of the induction motor, and the axis of ordinate represents the starting torque (%) with respect to IE3 standard.

The height of the rotor conductors 23 is not greater than 19 mm. In the aforementioned first to fourth embodiments, if it is assumed that an outer diameter ratio is defined as a ratio of the outer diameter of the stator core 11 to the outer diameter of the rotor core 21, squirrel cage induction motors having the outer diameter ratio not smaller than 1.69 (see FIG. 8) and not greater than 1.78 (see FIG. 8) satisfy the level of the IE3 standard, so that the squirrel cage induction motors with high efficiencies are provided. FIG. 8 shows actual measurement values obtained by measurement of a plurality of the prototype squirrel cage induction motors which are manufactured.

Figure 9:
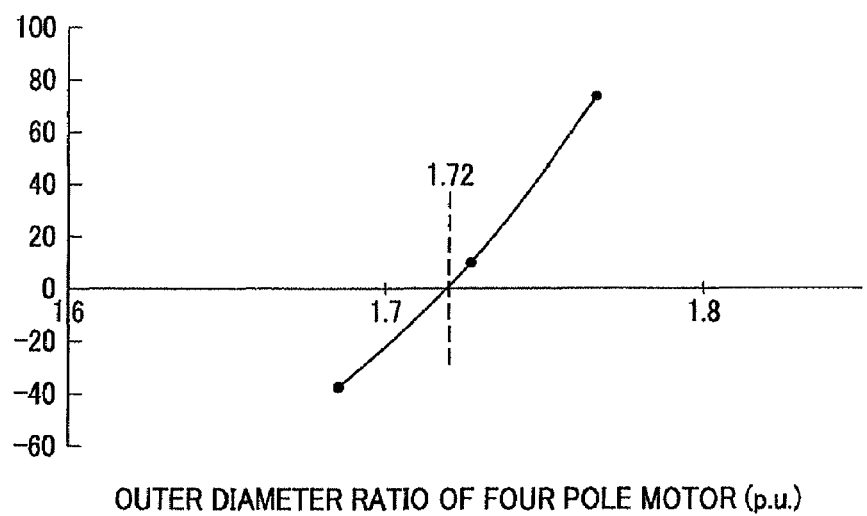
FIG. 9 is a chart of a starting torque characteristic of the four-pole type of squirrel cage induction motor according to the sixth embodiment of the present invention.

FIG. 9 is a drawing of a starting torque characteristic of four-pole type of the squirrel cage induction motor according to the sixth embodiment of the present invention with respect to JIS C4210 standard. The axis of abscissa represents the outer diameter ratio (p.u.) of the stator slot 12 to the rotor slot 22 of the four pole type induction motor, and the axis of ordinate represents the starting torque (%) with respect to JIS C4210 standard.

As shown in FIG. 9, when the outer diameter ratio is not smaller than 1.72, the starting torque satisfies the starting torque standard of JIS C4210, so that the squirrel cage induction motor having a desired starting torque can be provided. FIG. 9 shows actual measurement values obtained through measurement on various prototype squirrel cage induction motors which were manufactured. The outer diameter ratio at the measurement is not greater than 1.78 (see FIG. 8).

More specifically, according to the drawing of the efficiency characteristic of the four-pole type squirrel cage induction motor shown in FIG. 8 and the chart of the starting torque characteristic of the four-pole type squirrel cage induction motor shown in FIG. 9, when the outer diameter ratio of the stator slot 12 to the rotor slot 22 of the two-pole type squirrel cage induction motor is set to a value not smaller than 1.72 and not greater than 1.78 (see FIG. 8), a squirrel cage induction motor is provided with a high compatibility between the starting characteristic (with secureness of starting torque) and a steady characteristic (with a high efficiency).

Seventh Embodiment

Figure 10:
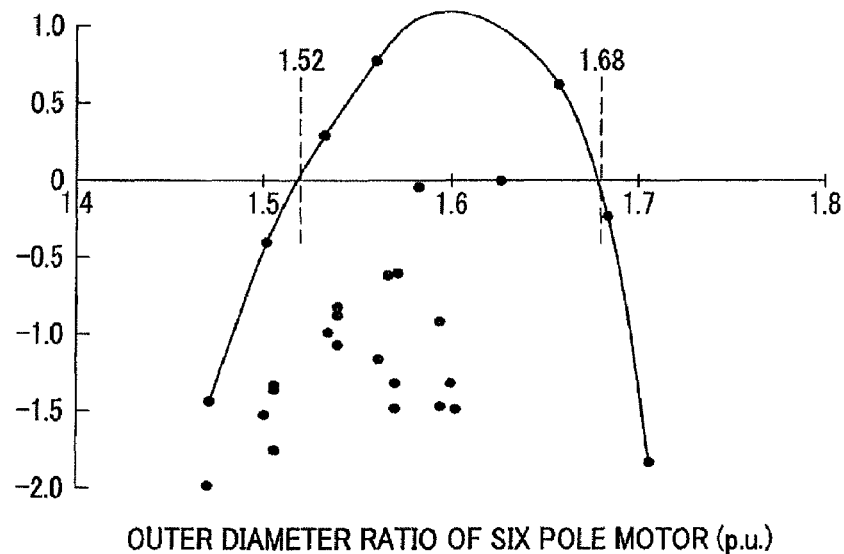
FIG. 10 is a chart of an efficiency characteristic of a six-pole type of squirrel cage induction motor according to a seventh embodiment of the present invention.

FIG. 10 is a chart of an efficiency characteristic of six-pole type of the squirrel cage induction motor according to a seventh embodiment of the present invention with respect to IE3 standard. The axis of abscissa represents the outer diameter ratio (p.u.) of the stator slot 12 of the six pole type of the induction motor to the rotor slot 22 of the six pole type of the induction motor, and the axis of ordinate represents the starting torque (%) with respect to IE3 standard.

The height of the rotor conductors 23 is not greater than 19 mm. In the aforementioned first to fourth embodiments, if it is assumed that an outer diameter ratio is defined as a ratio of the outer diameter of the stator core 11 to the outer diameter of the rotor core 21, squirrel cage induction motors having the outer diameter ratio not smaller than 1.52 and not greater than 1.68 satisfy the level of the IE3 standard, so that the squirrel cage induction motors with high efficiencies are provided. Plotted points shown in FIG. 10 show actual measurement values obtained by measurement of a lot of the prototype squirrel cage induction motor which were manufactured.

Figure 11:
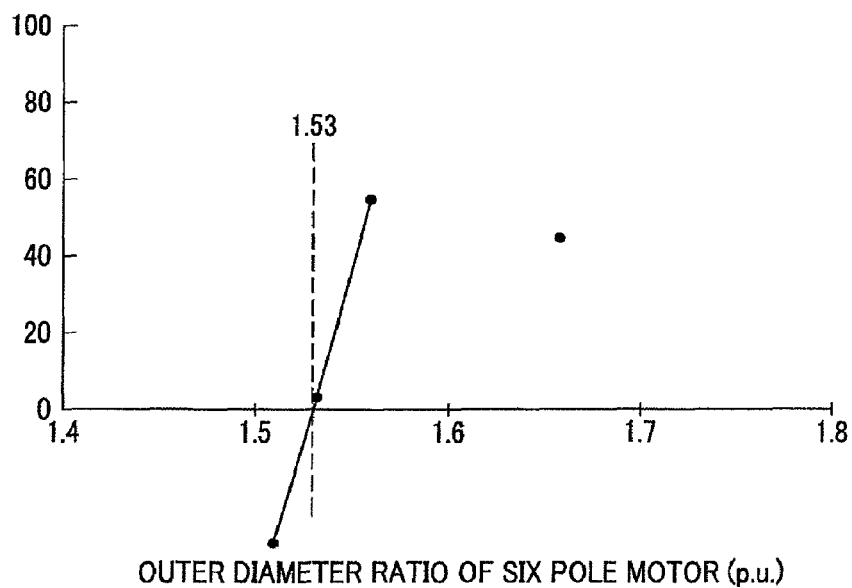
FIG. 11 is a chart of a starting torque characteristic of a six-pole type of squirrel cage induction motor according to the seventh embodiment of the present invention.

FIG. 11 is a chart of a starting torque characteristic of six-pole type of the squirrel cage induction motor according to the seventh embodiment of the present invention with respect to JIS C4210 standard. The axis of abscissa represents the outer diameter ratio (p.u.) of the stator slot 12 to the rotor slot 22, and the axis of ordinate represents the starting torque (%) with respect to JIS C4210 standard.

As shown in FIG. 11, when the outer diameter ratio is not smaller than 1.53, the starting torque satisfies the starting torque standard of JIS C4210, so that the squirrel cage induction motor having a preferable starting torque can be provided.

More specifically, according to the chart of the efficiency characteristic of the six-pole type squirrel cage induction motor shown in FIG. 10 and the chart of the starting torque characteristic of the six-pole type squirrel cage induction motor shown in FIG. 11, when the outer diameter ratio of the stator slot 12 to the rotor slot 22 of the six-pole type squirrel cage induction motor is set to a value not smaller than 1.53 and not greater than 1.68, a squirrel cage induction motor is provided with a high compatibility between the starting characteristic (secureness of starting torque) and a steady characteristic (with a high efficiency).

Eighth Embodiment

In the eighth embodiment, the conductor material of the stator winding 13 in the first to seventh embodiments is composed of aluminum. According to Electrical Engineering Handbook, aluminum has an electrical resistivity 1.64 times the electrical resistivity of copper. Accordingly, making the total area of the stator slots 12 1.64 times values of the first to seventh embodiments and setting the outer diameter ratio of the stator slot 12 to the rotor slot 22 of the six pole type squirrel cage induction motor to a value not smaller than 4.4 and not greater than 13.1 provides a squirrel cage induction motor with a high compatibility between the starting characteristic (secureness of starting torque) and a steady characteristic (with a high efficiency).

Ninth Embodiment

In the eighth embodiment mentioned above, aluminum is used for the stator winding 13. However, an aluminum alloy can be used, and a conductor with an electric resistivity equivalent to aluminum can be used also. For example, when an alloy of aluminum and copper is used, the electric resistivity becomes smaller than aluminum, which provides a squirrel cage induction motor with a higher efficiency than that of the eighth embodiment. When the electric resistivity of the stator winding 13 is smaller than that of the aluminum, the area ratio for providing a squirrel cage induction motor with compatibility between the starting characteristic (secureness of the starting torque) and the steady characteristic (with a high efficiency) will be further smaller than the value not greater than 4.4 and not greater than 13.1 according to the eighth embodiment.

The electric resistivity also varies with a temperature, and the electric resistivity of aluminum is 2.8265 $\mu\Omega$·cm at 20° C. according to Electrical Engineering Handbook and can be calculated at a given temperature T by an equation of 2.8265 (1+0.0040 (T−20)). Therefore, the electric resistivity is 0.57 $\mu\Omega$·cm at a cryogenic temperature, such as a temperature in liquid nitrogen, of −196° C. and 5.43 $\mu\Omega$·cm at a maximum allowable temperature of 250° C. in the JEC-2137-2000 standard which is Standard requirements defined by the Institute of Electrical Engineers of Japan.

Tenth Embodiment

In the tenth embodiment, the rotor winding 23 in the first to seventh embodiments is configured with aluminum. According to Electrical Engineering Handbook, aluminum has an electrical resistivity 1.64 times the electrical resistivity of copper. Therefore, multiplying the total area of the stator slots 12 in the first to seventh embodiments by 1.64 and setting the outer diameter ratio of the stator slot 12 to the rotor slot 22 of the rotor to a value not smaller than 1.6 and not greater than 4.9 provides a squirrel cage induction motor with a high compatibility between the starting characteristic (secureness of starting torque) and a steady characteristic (with a high efficiency).

Eleventh Embodiment

In the tenth embodiment mentioned above, aluminum is used for the rotor winding 23. However, an aluminum alloy can be used, and a conductor with an electric resistivity equivalent to aluminum can be used also. For example, when an alloy of aluminum and copper is used, the electric resistivity becomes smaller than aluminum, which provides a squirrel cage induction motor with a higher efficiency than that of the tenth embodiment. When the electric resistivity of the rotor winding 23 is smaller than that of the aluminum, the area ratio for providing a squirrel cage induction motor with compatibility between the starting characteristic (with secureness of the starting torque) and steady characteristic (with a high efficiency) shifts to a side on which the area ratio is further greater than a value not greater than 1.6 and not greater than 4.9 according to the tenth embodiment.

The electric resistivity also varies with a temperature, and the electric resistivity of copper is 2.8265 $\mu\Omega$·cm at 20° C. according to Electrical Engineering Handbook and can be calculated at a given temperature T by an equation of 2.8265 (1+0.0040 (T−20)). Therefore, the electric resistivity of copper is 0.57 $\mu\Omega$·cm at a cryogenic temperature, such as a temperature in liquid nitrogen, of −196° C. and 5.43 $\mu\Omega$·cm at a maximum allowable temperature of 250° C. in the JEC-2137-2000 standard which is Standard requirements defined by the Institute of Electrical Engineers of Japan.

Twelfth Embodiment

In the twelfth embodiment, the stator winding 13 and the rotor conductor 23 in the first to seventh embodiments is configured with aluminum. According to Electrical Engineering Handbook, aluminum has an electrical resistivity 1.64 times the electrical resistivity of copper. Accordingly, although the total area of the stator slots 12 to values of the first to seventh embodiments is multiplied by 1.64, the area ratio does not vary. Accordingly, if both the areas of the stator slot 12 and the rotor slot 22 in the first to seventh embodiments were multiplied by 1.64, the area ratio does not vary. Therefore, as similar to the first to seventh embodiments, setting the outer diameter ratio of the stator slot 12 to the rotor slot 22 of the squirrel cage induction motor to a value not smaller than 2.7 and not greater than 8.0 provides a squirrel cage induction motor with a high compatibility between the starting characteristic (secureness of starting torque) and a steady characteristic (with a high efficiency).

Thirteenth Embodiment

In the twelfth embodiment mentioned above, aluminum is used for the stator winding 13 and the rotor conductors 23. However, an aluminum alloy can be used, and a conductor with an electric resistivity equivalent to aluminum can be used also. For example, when an alloy of aluminum and copper is used, the electric resistivity becomes smaller than aluminum, which provides a squirrel cage induction motor with a higher efficiency than that of the twelfth embodiment. When the electric resistivity of the stator winding 13 is smaller than that of the aluminum, the area ratio for providing a squirrel cage induction motor with compatibility between the starting characteristic (with secureness of the starting torque) and the steady characteristic (with a high efficiency) shifts to a side on which the area ratio is further smaller than the range not greater than 2.7 and not greater than 8.0 according to the twelfth embodiment. In addition, when the electric resistivity of the rotor winding 23 is smaller than that of the aluminum, the area ratio for providing a squirrel cage induction motor with compatibility between the starting characteristic (with secureness of the starting torque) and the steady characteristic (with a high efficiency) shifts to a side on which the area ratio is further greater than the range not greater than 2.7 and not greater than 8.0 according to the twelfth embodiment.

The electric resistivity also varies with a temperature, and the electric resistivity of copper is 2.8265 $\mu\Omega$·cm at 20° C. according to Electrical Engineering Handbook and can be calculated at a given temperature T by an equation of 2.8265 (1+0.0040 (T−20)). Therefore, the electric resistivity of copper is 0.57 $\mu\Omega$·cm at a cryogenic temperature, such as a temperature in liquid nitrogen of −196° C. and 5.43 $\mu\Omega$·cm at a maximum allowable temperature of 250° C. in the JEC-2137-2000 standard which is Standard requirements defined by the Institute of Electrical Engineers of Japan.

Fourteenth Embodiment

In the fourteenth embodiment, will be described a self-start permanent magnet motor (also referred to as an MS motor) which is a modification of the squirrel cage induction motors described in the first to thirteenth embodiments.

A configuration of the self-start permanent magnet motor is not shown because of a well-known technology. However, referring to FIG. 1, the rotor 20 is configured with a rotor core 21, a plurality of rotor slots 22 disposed radially with predetermined intervals in a circumferential direction of the rotor core 21, rotor conductors 23 housed in the rotor slots 22 for generating a torque at startup, and permanent magnets disposed on an inner circumferential side of the rotor slots 22 for constantly generating a torque. A configuration on the side of the stator 10 may be the same as that shown in FIG. 1.

Because the self-start permanent magnet motor provides the same operation and advantageous effect as the first to thirteenth embodiments, it is possible to provide a self-start permanent magnet motor with compatibility between the starting characteristic (with secureness of the starting torque) and the steady characteristic (with a high efficiency).

CONCLUSION

As described above, the squirrel cage induction motors according to each of the embodiments of the present invention is based on each of various standards such as an allowable temperature standard for motor windings according to JEC (Japanese Electrotechnical Committee: The Institute of Electrical Engineers of Japan • Standard requirements defined by the Institute of Electrical Engineers of Japan), an efficiency standard of electronic motors by IEC (International Electrotechnical Commission: International Electrotechnical Commission), and a torque standard of electric motors by JIS (International Organization of Standardization: international standard correspondence). The area ratios of the total area of the rotor slots and the total area of the stator slots are determined so as to provide the efficiencies and torque characteristics which can clear these standards with compatibility between the starting characteristic (with secureness of the starting torque) and the steady characteristic (with a high efficiency). More specifically, when copper is used for the stator windings and the rotor conductors, and the area ratio is set within a range from 2.3 to 8.0 (peripherally, not smaller than 2.7 and not greater than 8.0), compatibility between the starting characteristic (starting torque) and the steady characteristic (for a high efficiency) can be provided. As mentioned above, the squirrel cage induction motors with a high efficiency and improvement in the starting torque can be provided by realizing the efficiencies and the starting torques exceed reference values which are the allowable temperature, the efficiency, and the torques defined by international standards.

DESCRIPTION OF REFERENCE NUMERALS 10 stator;
11 stator core;
12 stator slot;
13 stator winding;
20 rotor;
21,211,212,213,214 rotor core;
22,221,222,223,224 rotor slot;
23,231,232,233,234 rotor conductor.

The invention claimed is:
1. A squirrel cage induction motor comprising:
a stator core;
a plurality of stator slots radially disposed in a circumferential direction of the stator core with predetermined intervals;
a plurality of stator windings housed in the stator slots respectively;
a rotor core;
a plurality of rotor slots radially disposed in a circumferential direction of the rotor core with predetermined intervals; and
a plurality of rotor conductors housed in the rotor slots respectively,
wherein the stator windings and the rotor conductors comprise electrically conductive materials mainly composed of copper, and
wherein an area ratio of a total area of the stator slots to a total area of the rotor slots is not smaller than 2.3 and not greater than 8.0.

2. A squirrel cage induction motor comprising:
a stator core;
a plurality of stator slots radially disposed in a circumferential direction of the stator core with predetermined intervals;
a plurality of stator windings housed in the stator slots respectively;
a rotor core;
a plurality of rotor slots radially disposed in a circumferential direction of the rotor core with predetermined intervals; and
a plurality of rotor conductors housed in the rotor slots respectively,
wherein the stator windings and the rotor conductors comprise electrically conductive materials mainly composed of copper, and
wherein an area ratio of a total area of the stator slots to a total area of the rotor slots is not smaller than 2.7 and not greater than 8.0.

3. The squirrel cage induction motor according to claim 1, wherein the stator windings and the rotor conductors comprise electrically conductive materials having electric resistivity not smaller than 0.37 $\mu\Omega\cdot$cm and not greater than 3.28 $\mu\Omega\cdot$cm.

4. The squirrel cage induction motor according to claim 1, wherein when the number of magnetic poles is two, a ratio of an outer diameter of the stator core to an outer diameter of the rotor core is not smaller than 1.87 and not greater than 1.96.

5. The squirrel cage induction motor according to claim 1, wherein when the number of magnetic poles is four, a ratio of an outer diameter of the stator core to an outer diameter of the rotor core is not smaller than 1.72 and not greater than 1.78.

6. The squirrel cage induction motor according to claim 1, wherein when the number of magnetic poles is six, a ratio of an outer diameter of the stator core to an outer diameter of the rotor core is not smaller than 1.53 and not greater than 1.68.

7. A squirrel cage induction motor comprising:
a stator core;
a plurality of stator slots radially disposed in a circumferential direction of the stator core with predetermined intervals;
a plurality of stator windings housed in the stator slots, respectively;
a rotor core;
a plurality of rotor slots radially disposed in a circumferential direction of the rotor core with predetermined intervals respectively; and
a plurality of rotor conductors housed in the rotor slots respectively,
wherein the stator windings comprise an electrically conductive material mainly composed of aluminum, and wherein an area ratio of a total area of the stator slots to a total area of the rotor slots is not smaller than 4.4 and not greater than 13.1.

8. The squirrel cage induction motor according to claim 7,
wherein the stator windings comprise an electrical resistivity not smaller than 0.57 μΩ·cm and not greater than 5.43 μΩ·cm, and
wherein the rotor conductors comprise an electrical resistivity not smaller than 0.37 μΩ·cm and not greater than 3.28 μΩ·cm.

9. The squirrel cage induction motor according to claim 8,
wherein a height of the rotor conductor is not greater than 19 mm in the circumferential direction.

10. The squirrel cage induction motor according to claim 9 comprising a self-start motor,
wherein a rotor comprises the rotor core and a plurality of the rotor slots radially disposed in a circumferential direction of the rotor core with predetermined interval, and the rotor conductors housed in the rotor slots respectively, configured to generate a torque at a startup, and permanent magnets configured to generate a torque at a steady status; and
wherein a stator comprises the stator core and a plurality of the stator slots radially disposed in a circumferential direction of the stator core with predetermined interval, and the stator windings housed in the stator slots respectively.

11. A squirrel cage induction motor driving system comprising:
a squirrel cage induction motor according to claim 1; and
a three phase AC current power source configured to feed a three phase AC power to the squirrel cage induction motor,
wherein the three phase AC current power source comprises a commercial power source, the squirrel cage induction motor driving system further comprising: a circuit breaker configured to directly feed a power from the commercial power source to the stator windings or shut off an electric power to the stator windings.

* * * * *